(12) United States Patent
Dudar et al.

(10) Patent No.: US 10,589,742 B2
(45) Date of Patent: Mar. 17, 2020

(54) VEHICLE SNOW LEVEL RESPONSE

(71) Applicant: Ford Global Technologies, LLC, Dearborn, MI (US)

(72) Inventors: Aed M. Dudar, Canton, MI (US); Thomas G. Leone, Ypsilanti, MI (US); Kenneth J. Miller, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 277 days.

(21) Appl. No.: 15/827,006

(22) Filed: Nov. 30, 2017

(65) Prior Publication Data

US 2019/0161085 A1    May 30, 2019

(51) Int. Cl.
| | | |
|---|---|---|
| *B60W 30/18* | (2012.01) | |
| *G06T 7/50* | (2017.01) | |
| *G06T 7/13* | (2017.01) | |

(52) U.S. Cl.
CPC ......... *B60W 30/18009* (2013.01); *G06T 7/13* (2017.01); *G06T 7/50* (2017.01); *B60W 2420/42* (2013.01); *B60W 2550/12* (2013.01); *B60W 2710/30* (2013.01); *B60W 2720/10* (2013.01); *G06T 2207/10016* (2013.01); *G06T 2207/30192* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 7,417,738 | B2* | 8/2008 | Taylor | G01B 11/22 356/445 |
| 8,957,949 | B2* | 2/2015 | Randler | B60W 40/068 348/47 |
| 9,110,196 | B2 | 8/2015 | Urmson et al. | |
| 10,289,920 | B2* | 5/2019 | Hartmann | G06K 9/00798 |
| 2013/0211720 | A1 | 8/2013 | Niemz | |
| 2016/0101734 | A1 | 4/2016 | Baek | |
| 2016/0176523 | A1 | 6/2016 | Duncan et al. | |
| 2016/0379065 | A1 | 12/2016 | Hartmann | |
| 2017/0161571 | A1 | 6/2017 | Zhao et al. | |

* cited by examiner

*Primary Examiner* — Todd M Melton
(74) *Attorney, Agent, or Firm* — Frank A. MacKenzie; Bejin Bieneman PLC

(57) ABSTRACT

A system, including a processor and a memory, the memory including instructions to be executed by the processor to determine a best-fit snow boundary in an image including a reference object, determine a snow level based on comparing the best-fit snow boundary to the image of the reference object, and operate a vehicle by actuating vehicle components based on the determined snow level.

20 Claims, 6 Drawing Sheets

VEHICLE SNOW LEVEL RESPONSE

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Therefore, it is very important that vehicle sensors provide the most accurate data possible concerning the vehicle's environment. For example, safe and comfortable operation of the vehicle can depend upon acquiring accurate and timely information regarding weather conditions in the vicinity of the vehicle.

DETAILED DESCRIPTION

Figure 1:
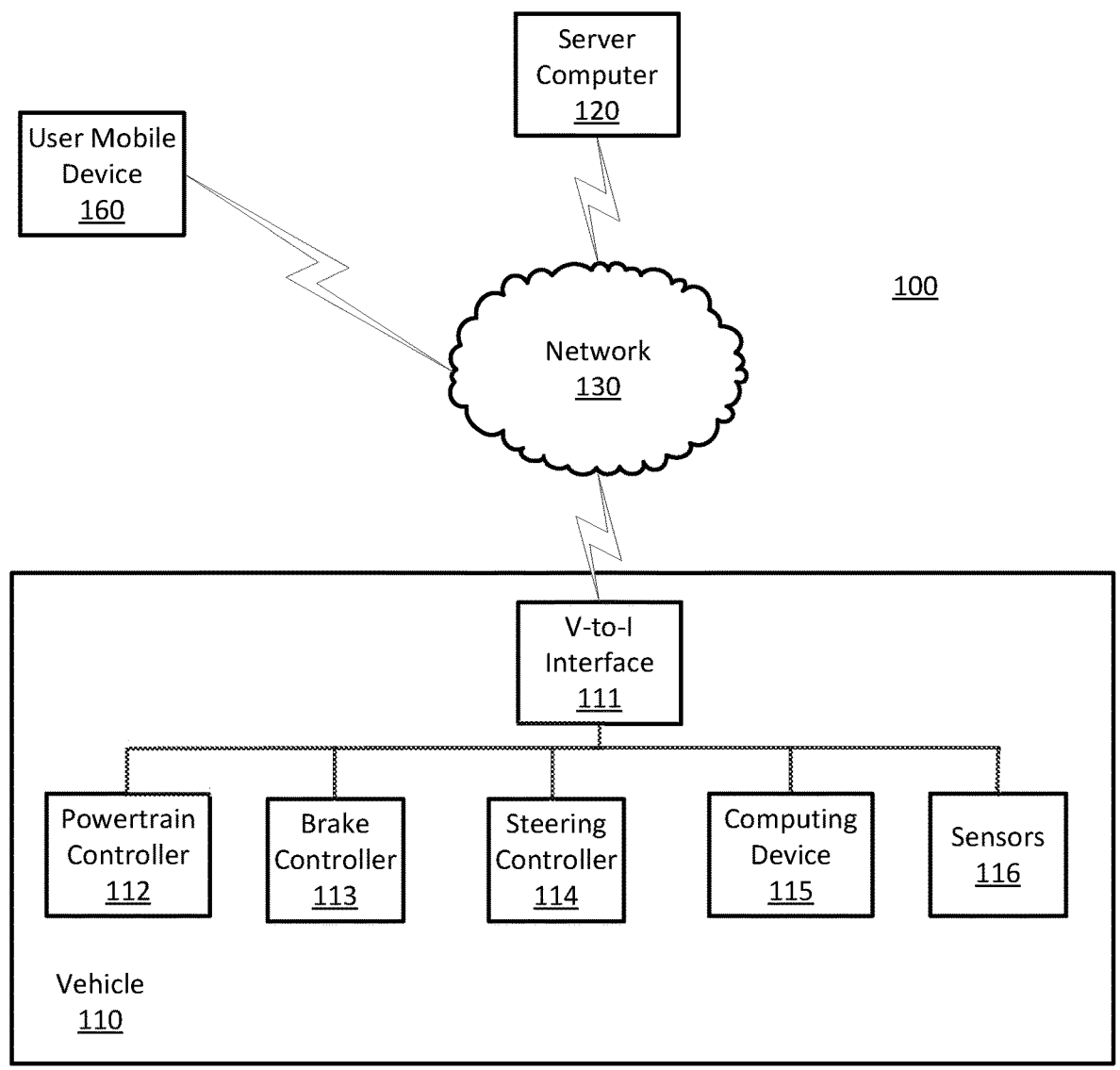
FIG. 1 is a block diagram of an example vehicle.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted partly or entirely without assistance of a human occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A vehicle operating in autonomous mode can be expected to operate successfully in all weather conditions in which a human operator can be expected to operate successfully. This means that a vehicle operating in autonomous mode can be expected to operate successfully in adverse weather conditions including operating on roadways with some levels of accumulation of snow, for example. Vehicles operating in adverse weather conditions can determine a snow level based on acquired video image data and use the snow level to predict vehicle operation on snow-covered roadways.

Disclosed herein is a method, comprising determining a best-fit snow boundary in an image including a reference object, determining a snow level based on comparing the best-fit snow boundary to the image of the reference object, and, operating a vehicle by actuating vehicle components based on the determined snow level. The vehicle can be operated by predicting that actuating vehicle components will result in successfully moving the vehicle to a determined location at a determined speed along a determined path at the determined snow level, wherein the predicting that actuating vehicle components will result in successfully moving the vehicle to the determined location at the determined speed along the determined path at the determined snow level includes determining a vehicle traction coefficient. The vehicle traction coefficient can be determined based on a temperature, a drive type, a tire type, and a tire condition. Determining the best-fit snow boundary can include determining a line parallel to a roadway that minimizes a least squares error from the line to points associated with a tire/snow boundary in the image.

The reference object can be a vehicle tire. Comparing the best-fit snow boundary to the vehicle tire can include determining a tire radius based on determining a tire type. The reference object can a portion of the vehicle including a tailpipe, a bumper, a light, or a fascia. Comparing the best-fit snow boundary to the portion of the vehicle can include determining a height for the portion of the vehicle. Operating a vehicle by actuating vehicle components can be based on the determined snow level and can include conditioning the operation of the vehicle based on the snow level. Conditioning the operation of the vehicle based on the snow level can include determining maximum limits on speed, longitudinal acceleration and latitudinal acceleration, wherein the maximum limits on speed, longitudinal acceleration and latitudinal acceleration are based on the determined snow level and a determined traction coefficient. Operating the vehicle cam include parking the vehicle and remaining parked, wherein determining to park and remain parked is based on weather information received by the vehicle.

Further disclosed is a computer readable medium, storing program instructions for executing some or all of the above method steps. Further disclosed is a computer programmed for executing some or all of the above method steps, including a computer apparatus, programmed to determine a best-fit snow boundary in an image including a reference object, determine a snow level based on comparing the best-fit snow boundary to the image of the reference object, and, operate a vehicle by actuating vehicle components based on the determined snow level. The vehicle can be operated by predicting that actuating vehicle components will result in successfully moving the vehicle to a determined location at a determined speed along a determined path at the determined snow level, wherein the predicting that actuating vehicle components will result in successfully moving the vehicle to the determined location at the determined speed along the determined path at the determined snow level includes determining a vehicle traction coefficient. The vehicle traction coefficient can be determined based on a temperature, a drive type, a tire type, and a tire condition. Determining the best-fit snow boundary can include determining a line parallel to a roadway that minimizes a least squares error from the line to points associated with a tire/snow boundary in the image.

The reference object can be a vehicle tire. Comparing the best-fit snow boundary to the vehicle tire can include determining a tire radius based on determining a tire type. The reference object can a portion of the vehicle including a tailpipe, a bumper, a light, or a fascia. Comparing the best-fit snow boundary to the portion of the vehicle can include determining a height for the portion of the vehicle. Operating a vehicle by actuating vehicle components can be based on the determined snow level and can include conditioning the operation of the vehicle based on the snow level. Conditioning the operation of the vehicle based on the snow level can include determining maximum limits on speed, longitudinal acceleration and latitudinal acceleration, wherein the maximum limits on speed, longitudinal acceleration and latitudinal acceleration are based on the determined snow level and a determined traction coefficient. Operating the vehicle cam include parking the vehicle and remaining parked, wherein determining to park and remain parked is based on weather information received by the vehicle.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors, i.e., measurable physical manifestations of vehicle 110 operation such as speed, acceleration, deceleration, steering, etc., as well as tactical behaviors, i.e., control of operational behaviors to traverse from one location to another, e.g., a tactical behavior can be a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle 110 subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via a vehicle 110 network such as a communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

A vehicle 110 operating in autonomous mode can receive a request to operate from an occupant via controls included in vehicle 110 or via a wired or wireless computer such as a cell phone or handheld controller. Vehicle 110 can also receive a request to operate from a server computer 120 via a network 130. Vehicle 110, operating in autonomous mode, can be expected to respond to a request to operate despite adverse weather conditions; e.g., a fully autonomous vehicle 110 can be expected to operate successfully despite adverse weather conditions in which a human occupant would be expected to operate a vehicle successfully. For example, a vehicle 110 can be expected to operate successfully in the presence of light snow on a roadway, where the amount of snow on the roadway would not prevent an occupant from operating the vehicle 110 successfully. Successful operation of a vehicle can be defined as successfully reaching a determined destination at a determined speed along a determined path.

Successful operation of a vehicle 110 on a snow-covered roadway can depend upon a snow level on the roadway and a vehicle 110 traction coefficient based on predicted coefficients of friction for tires of vehicle 110 that summarizes the ability of the vehicle 110 to operate in weather conditions like snow. Snow level is defined as a measure of the average depth of snow on a roadway or surface measured in inches or millimeters perpendicular from the roadway to a boundary formed by an average boundary between snow and air. The traction coefficient is a measure of the total traction available for a vehicle as a function of the number of wheels being driven (two or four) and the vehicle weight per wheel multiplied by the coefficient of friction of the tire. The coefficient of friction of a tire $F_i$ can be estimated by factors including vehicle weight W, tire radius R, tire type T, including composition (radial, bias-ply, etc.) and tread pattern (all-season, winter, off-road, etc.), and tire condition C (age, mileage, tread wear, etc.) according to the equation:

$$F_i = aW + bR + cT + dC \quad (1)$$

where constants a, b, c, and d can be experimentally determined for values of vehicle weight W, tire radius R, tire type T, and tire condition C. The coefficient of friction of a tire $F_i$ can predict when lateral and longitudinal accelerations applied to vehicle 110 by powertrain, braking and steering components will cause the tire i to skid. Safe and comfortable operation of vehicle 110 directs powertrain, braking and steering components so as to avoid skids.

Determination of a traction coefficient $T_c$ for a vehicle 110 can be performed by summing over the number of wheels driven by the vehicle 110 powertrain with the equation:

$$T_c = \Sigma_{i=1}^{n} F_i, n \in \{2,4\} \quad (2)$$

The traction coefficient $T_c$ can be multiplied with a snow level S to predict whether the vehicle 110 can be successfully operated Op at that snow level S according to the equation:

$$Op = \begin{cases} \text{if } T_c \cdot S \geq L, & Op = \text{no} \\ \text{if } T_c \cdot S < L, & Op = \text{yes} \end{cases} \quad (3)$$

The product of multiplying the snow level S with the vehicle 110 traction coefficient $T_c$ can be compared to an experimentally determined limit L and if the product is less than the limit L, computing device 115 can predict that vehicle 110 will successfully operate on the roadway (Op=yes). If the product of multiplying the snow level S with the vehicle traction limit $T_c$ is greater than or equal to the limit L, computing device 115 predicts that vehicle 110 cannot operate successfully on the roadway (Op=no). This assumes that the relationship between snow level and successful operation of the vehicle 110 is linear, i.e. as snow level increases, operation of vehicle 110 becomes less predictable until at some snow level, computing device 115 can determine that vehicle 110 should not be operated.

In examples where computing device 115 determines that vehicle 110 cannot successfully operate, computing device 115 can respond to a request to operate from a server computer 120 or occupant by informing the server computer 120 or occupant that it has determined that it cannot predict successful operation based on the snow level and remaining parked. In some examples, vehicle 110 can be operating when a snow level is determined and combined with a vehicle 110 traction coefficient to predict that the vehicle will not be successfully operated. In this example computing device 115 can direct vehicle 110 to park in an available parking location on or adjacent to the roadway and alert appropriate authorities via V-to-I network 111, signaling by flashing lights or beacons, and waiting until assistance is provided. For example, a vehicle 110 can be operated on a roadway that has been cleared of snow when a programmed destination routes the vehicle 110 onto an uncleared roadway. In this example, computing device 115 can determine a snow level for the uncleared roadway and determine whether to operate the vehicle 110 on the uncleared roadway, operate the vehicle 110 on an alternate route using cleared roadways, or park the vehicle 110.

In other examples, when computing device 115 has determined that the product of the snow level and the vehicle 110 traction coefficient is greater than the traction limit, vehicle 110 can communicate with other vehicles via V-to-V networking to find another vehicle with a higher traction coefficient and hence an ability to operate in greater snow levels and request platooning. Platooning is an operating mode wherein a vehicle 110 communicates with another vehicle via V-to-V networking to closely follow the other vehicle including relying on information regarding the roadway received from the other vehicle. Platooning can permit a vehicle 110 to operate successfully in snow levels that would be too high without platooning.

Computing device 115 can also use the determined snow level to condition the operation of vehicle 110. For example, computing device 115 can limit the maximum speed and the maximum allowable longitudinal (powertrain and braking) and lateral (steering) accelerations based on the snow level, i.e. a non-zero snow level that is less than the limit that would prevent operation. Non-zero snow level that is less than the limit can produce slippery operating conditions that can require limiting longitudinal and lateral accelerations and maximum speed based on snow level and traction coefficient to provide successful operation of vehicle 110, for example.

Computing device 115 can obtain snow levels from weather observations recorded at various locations such as weather stations and transmitted to server computer 120, for example. This snow level can represent an average estimate for a region or area but does not necessarily represent snow levels in the immediate vicinity of a vehicle 110 because of squalls, drifting, and micro-climates caused by natural features of buildings. Regional snow level estimates can be used by computing device 115 in addition to video image-based techniques described herein to determine whether or not to operate vehicle 115. For example, video-based techniques as disclosed herein can determine that snow level in the immediate vicinity of vehicle 110 is low enough to permit successful operation of a vehicle 110, while weather information received via V-to-I networking 111 indicates that roadways in the area are covered with deep, drifting snow. In this example, although the immediate vicinity of vehicle 110 can be determined by computing device 115 to be relatively clear, because of weather information regarding the snow levels in an area around vehicle 110, computing device 115 can determine that vehicle 110 should not operate and stay parked.

Additional factors can be included in determining a vehicle 110 traction coefficient. Vehicle traction in snow can depend upon temperature, where temperatures below freezing can permit the formation of ice, for example. Computing device can determine the ambient temperature via sensors 116 and include a weighted temperature value in the calculation of vehicle 110 traction coefficient, for example. Vehicle 110 traction coefficient can also be a function of vehicle ground clearance, which is the vertical distance between a roadway and the bottom of a vehicle 110, excepting tires and wheels.

Figure 2:
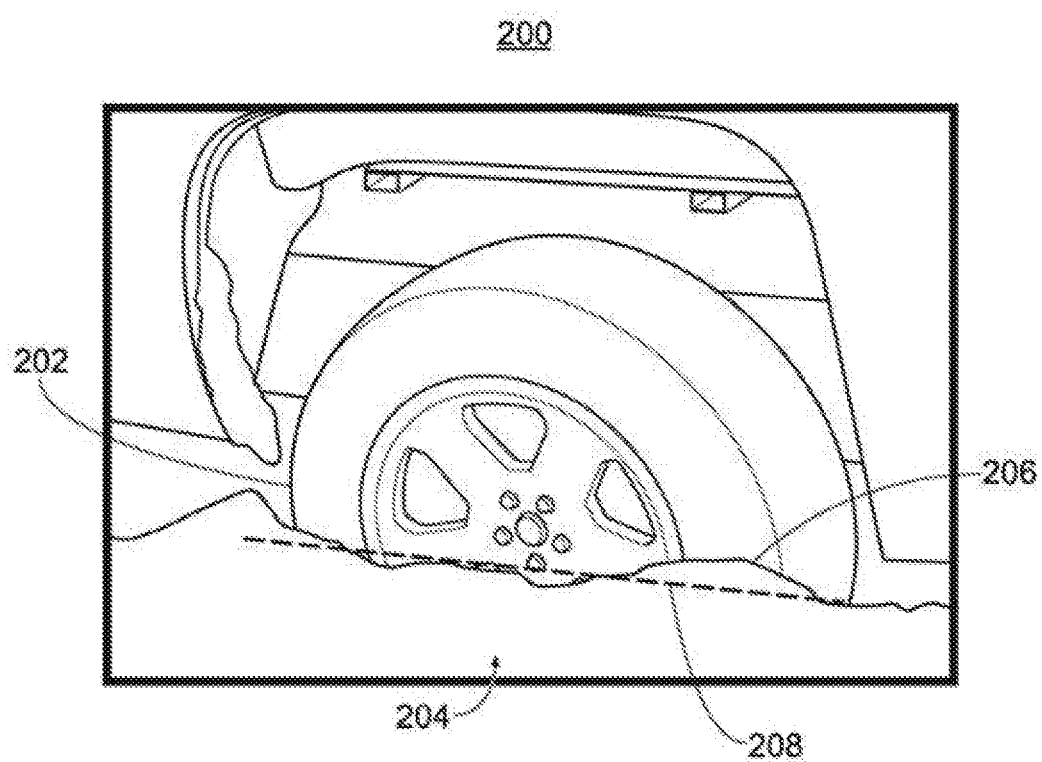
FIG. 2 is a diagram of an example video image of a portion of a vehicle including a tire.

FIG. 2 is a diagram of a video image 200 of a portion of a vehicle 110 including a tire 202. The video image 200 includes snow 204 having a discernable tire/snow boundary 206 between snow 204 and tire 202. A discernable tire/snow boundary is a portion of a video image 200 that can distinguish between the portion of video image including snow 204 and portions of video image that do not include snow 210 including tire 202 using a machine vision program. For example, in a video image 200 that includes a tire, a machine vision program can make the assumption that in the absence of snow, a whole tire would be visible. By inferring the size of a whole tire based on the visible tire 202 and comparing the size of the whole tire with the visible tire 202, the machine vision program can determine that a portion of tire 202 is obscured by snow 204. The machine vision program can then determine the tire/snow boundary based on portions of the video image 200 determined to be snow 204 and portions of the video image 200 determined not to be snow 204 including tire 202.

A best-fit snow boundary 208 (explained further below) can associated with the discernable tire/snow boundary 206, and can be combined with information regarding the size and type of tire to estimate a snow level above a roadway. The video image 200 can be acquired by a vehicle 110 including one of its own tires, by employing a camera mounted on the underside of a rear-view mirror and angled to acquire and image that includes a front or rear tire, for example. In this example, vehicle 110 is acquiring a video image of its own tire, and computing device 115 stores in a memory a size and type of tire is included in the vehicle 110.

In some examples vehicle 110 is not configured to acquire a video image that includes a vehicle 110 tire. In this example, computing device 115 can transmit a message to other vehicles in the vicinity, e.g., within a predetermined radius such as ten meters, twenty-five meters, etc., requesting that the other vehicles acquire a video image of vehicle 110 including at least one tire, and transmit the video image to vehicle 110 via V-to-V networking as discussed above in relation to FIG. 1. Computing device 115 can then determine a snow level based on determining a best-fit snow boundary against a tire in the image, based on information stored at computing device 115 regarding the size and type of tire. Information regarding tire size and type can be input to computing device 115 when tires are fitted on vehicle 110 either at time of manufacture or when servicing vehicle 110 thereafter. Computing device 115 can track tire usage including recording mileage and tread measurements made during periodic servicing of vehicle 110. In addition to actual tread measurements, computing device 115 can estimate tread wear based on mileage traveled. Computing device 115 can also track tire air pressure, for example, by acquiring tire air pressure data from tire air pressure sensors 116. Tire size and type can be used to determine snow levels while tire usage including wear can be used to determine vehicle traction coefficients.

In other examples, vehicle 110 can acquire video image 200 of a portion of another vehicle including a tire 202 belonging to another vehicle. Computing device 115 can determine best-fit snow boundaries against another vehicle's tire 202, but cannot estimate snow levels above a roadway without information regarding the tire 202 size and type. Computing device 115 can access locally stored information or can communicate with a server computer 120 via V-to-I networking 111 to determine the size and type of tire 202 based on determining the type of the other vehicle including make and model, for example. Computing device 115 or server computer 120 can determine the type of the other vehicle including make and model by inspecting a video image of the other vehicle, for example. Once the type of other vehicle is determined, information regarding make and model can be associated with a tire 202 size and type. In other examples, where computing device 115 or computer server 120 cannot determine tire 202 size and type based on the make and model of the other vehicle, computing device 115 or server computer 120 can determine a tire 202 size and type by reading labels molded into the sidewalls of tire 202 that describes the tire 202. Further, optical character recognition programs executing on computing device 115 or server computer 120 could be able to decode labels and provide information regarding tire 202 size and type.

Figure 3:
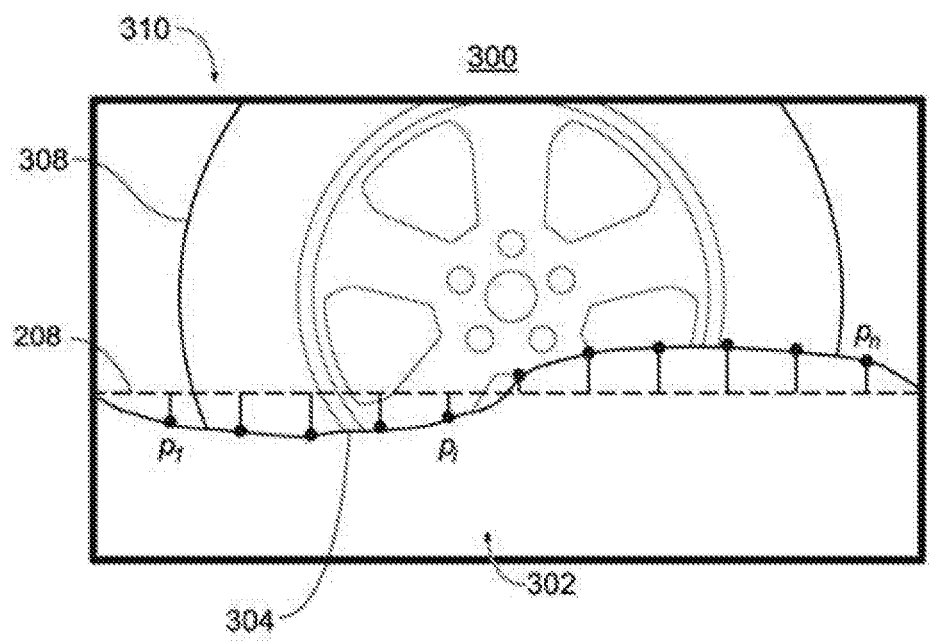
FIG. 3 is a diagram of an example video image with a best-fit snow boundary.

FIG. 3 is a diagram of an example video image 300 with a best-fit snow boundary 208 Best-fit snow boundary 208 can be determined based on a discernable tire/snow boundary 206. As discussed above in relation to FIG. 2, a discernable tire/snow boundary 206 can be determined by a machine vision program executing on computing device 115 or server computer 120 that looks for portions of tire 308 occluded by snow 302. A best-fit snow boundary 208 can be determined based on points $p_i$ (1≤i≤n) on the discernable tire/snow boundary 206, including the points adjacent to and between portions of tire 308. The best-fit snow boundary 208 can be a straight line that minimizes the least-squares distance between points $p_i$ (1≤i≤n) and the best-fit snow boundary 206, represented by the straight lines joining the points $p_i$ (1≤i≤n) and the best-fit snow boundary 206.

The best-fit snow boundary 208 can be determined based on points by a variety of techniques that depend upon expressing the best-fit snow boundary as a linear equation of the form:

$$y=ax+b \tag{4}$$

Assuming the x variable represents the location of the point along the tire/snow boundary 208 and the y variable represents the height, least squares techniques for solving linear equations seek to find parameters a and b that minimize the least squares distance from the points x, y locations to the line represented by the linear equation, where the least squares distance is the sum of the squared distances of the points to the line measured along a perpendicular to the line. Linear regression is an example technique for finding a best-fit snow boundary 208 from a set of points on a tire/snow boundary 206.

The best-fit snow boundary 208 can be constrained to be at an angle in a video image 300 that is parallel to the roadway or surface under vehicle 110 based on the field of view and lens of the camera that acquired the video image 300. Information regarding the field of view and lens of a camera, known at the time of manufacture, permits the angle of the image plane with respect to a roadway or surface in the field of view to be determined. Once determined for a camera, the angle of the best-fit snow boundary is known for subsequent video images 300. In cases where a video image 300 is acquired from another vehicle, the other vehicle can include information regarding the field of view and lens of the camera acquiring the video image 300. In examples where information regarding the field of view and lens of the camera is not available, computing device 115 can determine an angle for the best-fit snow boundary by determining landmarks in a video image 300. For example, if two tires are visible in the video image 300, computing device 115 can determine that the angle of the best-fit snow boundary should be parallel to at line joining the centers of the tires.

Figure 4:
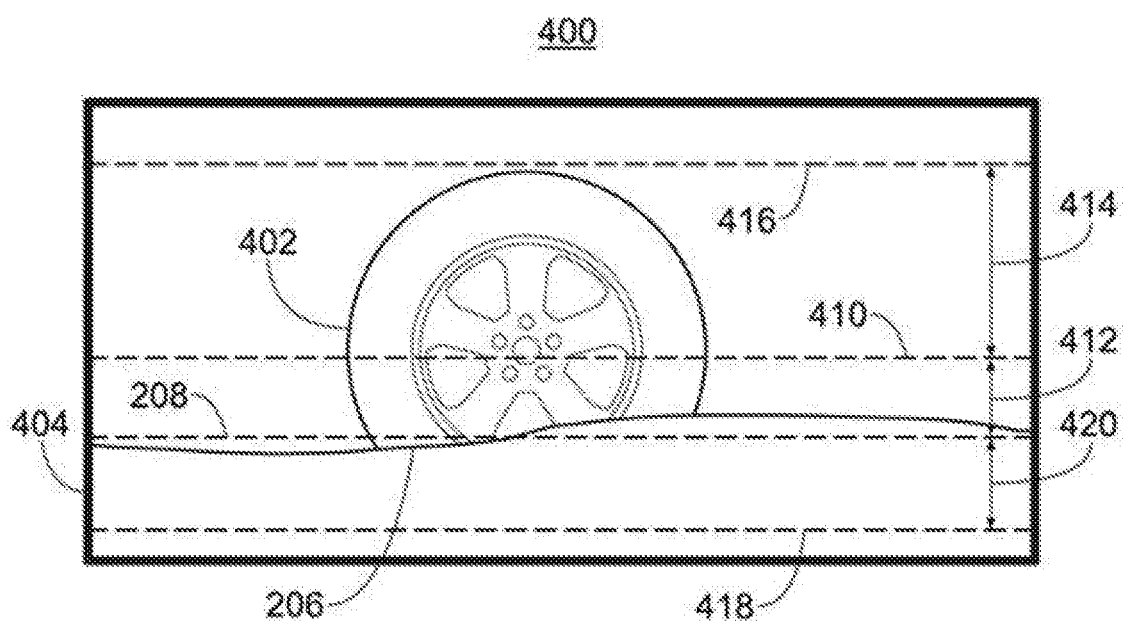
FIG. 4 is a diagram of an example video image with a tire and a snow level.

FIG. 4 is a diagram of an example video image 400 with a tire 402 and a snow level 420. The snow level 420 can be determined by computing device 115 by acquiring a video image 400 and processing the video image 400 with a machine vision program that determines a snow/tire boundary 206 and a best-fit snow boundary 208 as discussed above in relation to FIGS. 2 and 3. Computing device 115 can also use machine vision or optical recognition as mentioned above to determine that at least a portion of a tire 402 is present in the video image 400 and based on the determined portion of a tire 402, determine a center line 410. The center line 410 passes through a determined center of tire 402 and is constructed at an angle parallel to the roadway or surface underneath tire 402. Computing device 115 can determine an angle parallel to the roadway or surface underneath tire 402 based on the 3D direction in space of an optical axis and a magnifying power of a lens of a video camera acquiring video image 400. Computing device 115 can use the machine vision program to determine a radius 414 for tire 402, which can be used to construct a top line 416 tangent to the top of tire 402 and parallel to the center line 410.

By making allowance for flattening of the radius 414 of tire 402, computing device can construct a ground line 418, parallel to the center line 410 and top line 416 therefore parallel to the roadway or surface underneath tire 402. The allowance can be based on tire pressure $T_p$, temperature $T_d$, vehicle 110 weight per tire $T_w$ and tire type $T_t$, for example, and can be stored at computing device 115 as predetermined tables including values to be subtracted from the radius 414 based on current tire pressure and temperature as measured by sensors 116, for example. Tire flattening allowance A can be expressed as a percentage of the tire radius and computed according to the equation:

$$A=eT_p+fT_d+gT_w+hT_t \tag{5}$$

where constants e, f, g, and h can be determined empirically.

In some examples, vehicle 110 can include an onboard inflation pump that can inflate vehicle 110 tires based on tire inflation sensors 116 determining that tire air pressure was not at the predetermined nominal air pressure. In examples where a tire is the reference object and the tire air pressure is low, the onboard inflation pump can inflate the tire to the nominal pressure, thereby causing the tire to return to a shape with a known flattening allowance A based on known air pressure, temperature and vehicle weight. These values could be calculated with equation 5 or precalculated and stored in a table in computing device 115 memory. In other examples vehicle 110 includes active suspension. Active suspension can change the height and pose of vehicle 110 with respect to a roadway or surface by activating suspension components electro-mechanically, hydraulically, or pneumatically, for example, to change the direction and magnitude of force which vehicle 110 weight is applied to tires by vehicle 110 suspension components. Inertial navigation system (INS) sensors 116 included in vehicle 110 can determine the height of vehicle 110 and thereby the ground clearance of reference objects based on accelerometer data with six degrees of freedom including three orthogonal spatial dimensions and three rotations about the three dimensions. INS sensor 116 included in vehicle 110 can also determine the pose of vehicle 110 in space and thereby determine whether vehicle 110 is level with respect to the roadway or surface upon which vehicle 110 is supported. Active suspension components can be directed by computing device 115 to level vehicle 110 and thereby provide known ground clearance for vehicle 110.

Computing device 115 can then, based on a snow depth 412 determined by the distance between the center line 410 and the best-fit snow boundary 208, determine a snow level 420 based on the ground line 418 and the snow depth 412. Snow level 420 S can be determined by subtracting snow depth 412 X from radius 414 R by the equation:

$$S=R-X \tag{6}$$

Computing device 115 can convert the snow level 420 from video image 400 pixels into by using stored information regarding the radius 414 of tire 402 expressed in physical units such as inches or millimeters and the measured radius 414 in pixels to convert snow level 420 from pixels to inches or millimeters. For example, if the radius 414 R of tire 402 is 16" (sixteen inches) from information stored at computing device 115 and measures the radius 414 $R_m$ as 10 pixels and the snow depth 412 $X_m$ as 4 pixels, converting radius 414 $R_m$ and snow depth 412 $X_m$ by multiplying the values times inches/pixel=1.6", yields a snow level 420 S of 6.4" in this example. As discussed above, this value can be adjusted to compensate for flattening of the radius 414 R of tire 402 at the ground due to vehicle 110 weight.

Figure 5:
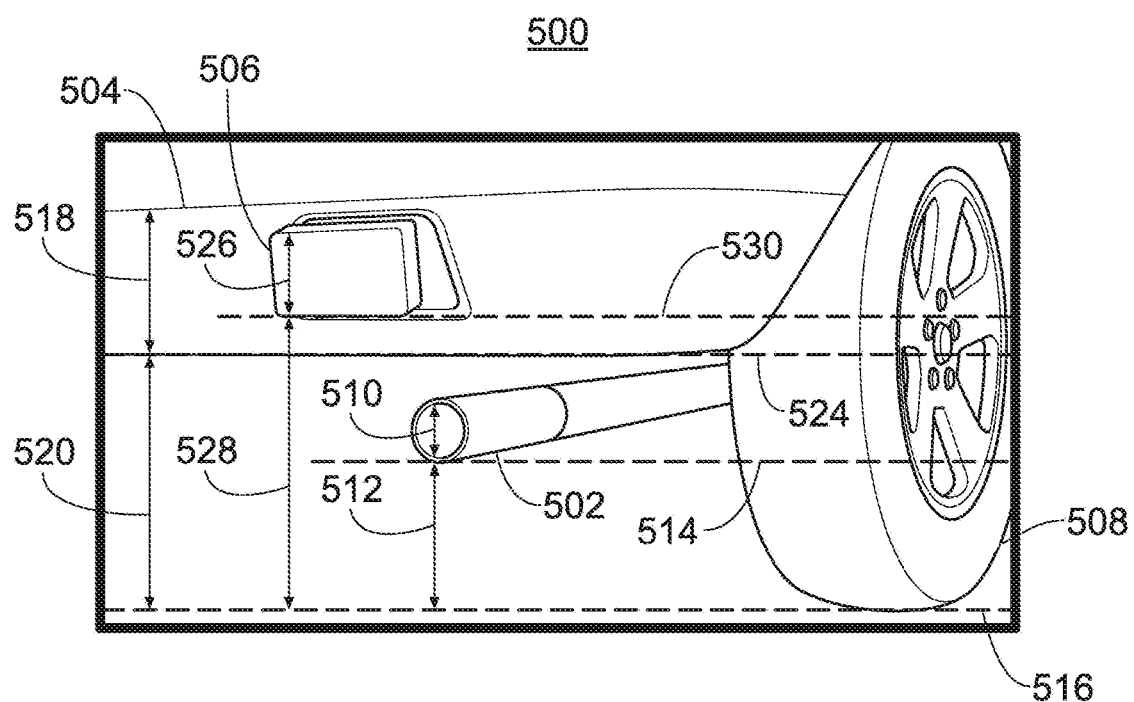
FIG. 5 is a diagram of an example video image of a portion of a vehicle including a tire, a light, a bumper and a tailpipe.

FIG. 5 is of an example video image 500 of a portion of a vehicle 110 including a tire 508, a light 506, a bumper or fascia 504 and a tailpipe 502. In examples where computing device 115 requests a video image 500 from another vehicle, and the other vehicle is positioned so as to acquire views of portions of vehicle 110 in addition to tire 508, wherein portions of vehicle 110 including a tailpipe 502, a bumper or fascia 504, and a light 506, are visible. These portions of vehicle 110 can be used as reference objects to determine a snow level in addition to a tire 508. The portions of vehicle 110 including a tailpipe 502, a bumper or fascia 504, and a light 506, etc. are all of known size 510, 518, 526 and known distance 512, 520, 528 from a roadway or surface. The known size 510, 518, 526 and known distance 512, 520, 528 can be associated with the make and model of vehicle 110 and stored at computing device 115 or server computer 120. The measured size 510, 518, 526 can be determined by computing device 115 using a machine vision program on video image 500 to determine the presence of a tailpipe 502, a bumper or fascia 504, or a light 506 and measure its height in pixels. Computing device can then use the ratio of pixels to known size 510, 518, 526 to determine a value for inches or millimeters/pixel for video image 500.

Computing device 115 can acquire a video image 500 including a tire 508, and one or more portions of vehicle 110 including a tailpipe 502, a bumper or fascia 504, and a light 506. When the video image 500 includes snow, computing device 115 can use techniques described above in relation to FIGS. 2, 3 and 4 to determine a best-fit snow boundary 208 using a tire/snow boundary 206 on tire 508 and reference objects including a tailpipe 502, a bumper or fascia 504, and a light 506, and determine a snow depth 412 based on a ground line 516 determined from the determined inches or millimeters/pixel and the known distances 512, 520, 528 by subtracting the best-fit snow boundary 208 from a light height 530, a bumper or fascia height 524 or a tailpipe height 514 to find the snow level 420 above the ground line 516 as in equation 2. In this fashion, a snow level 420 can be determined in examples where not enough of tire 508 is visible to accurately determine a radius, for example. In examples where the snow level is high enough to obscure the reference objects, as discussed above in relation to FIG. 4, active suspension components can be directed by computing device 115 to raise the level of vehicle 110 to a known level above a ground plane to permit reference objects to be seen above the snow and thereby used to determine a snow level. Computing device can preemptively raise the level of vehicle 110 based on a weather forecast received from a server computer 120 so that at a later time when a snow level is determined, reference objects on vehicle 110 will likely be above the snow level.

In the same fashion as discussed above in relation to FIGS. 2, 3, and 4, the video image 500 can be acquired by vehicle 110 of another vehicle. Computing device 115 can determine portions of another vehicle including a tire 508, a tailpipe 502, a bumper or fascia 504, and a light 506. Computing device 115 or computer server 120 can determine the make and model of the other vehicle and thereby determine the known sizes 510, 518, 526 and distances 512, 520, 528 for portions of another vehicle. Computing device 115 can use the known sizes 510, 518, 526 and distances 512, 520, 528 for portions of another vehicle to determine ratios of inches or millimeters/pixel for portions of other vehicles included in video image 500 and thereby determine a snow level 420 based on the portions of another vehicle. Computing device can use a combination of all of the techniques discussed above in relation to FIGS. 2-5 to acquire multiple video images 200, 300, 400, 500 and determine multiple snow levels 420. This can reduce the effects of local drifting that may provide different snow levels 420 for different video images 200, 300, 400, 500. In this case computing device can determine and average or a median value for the multiple snow levels to use as a snow level 420.

Figure 6:
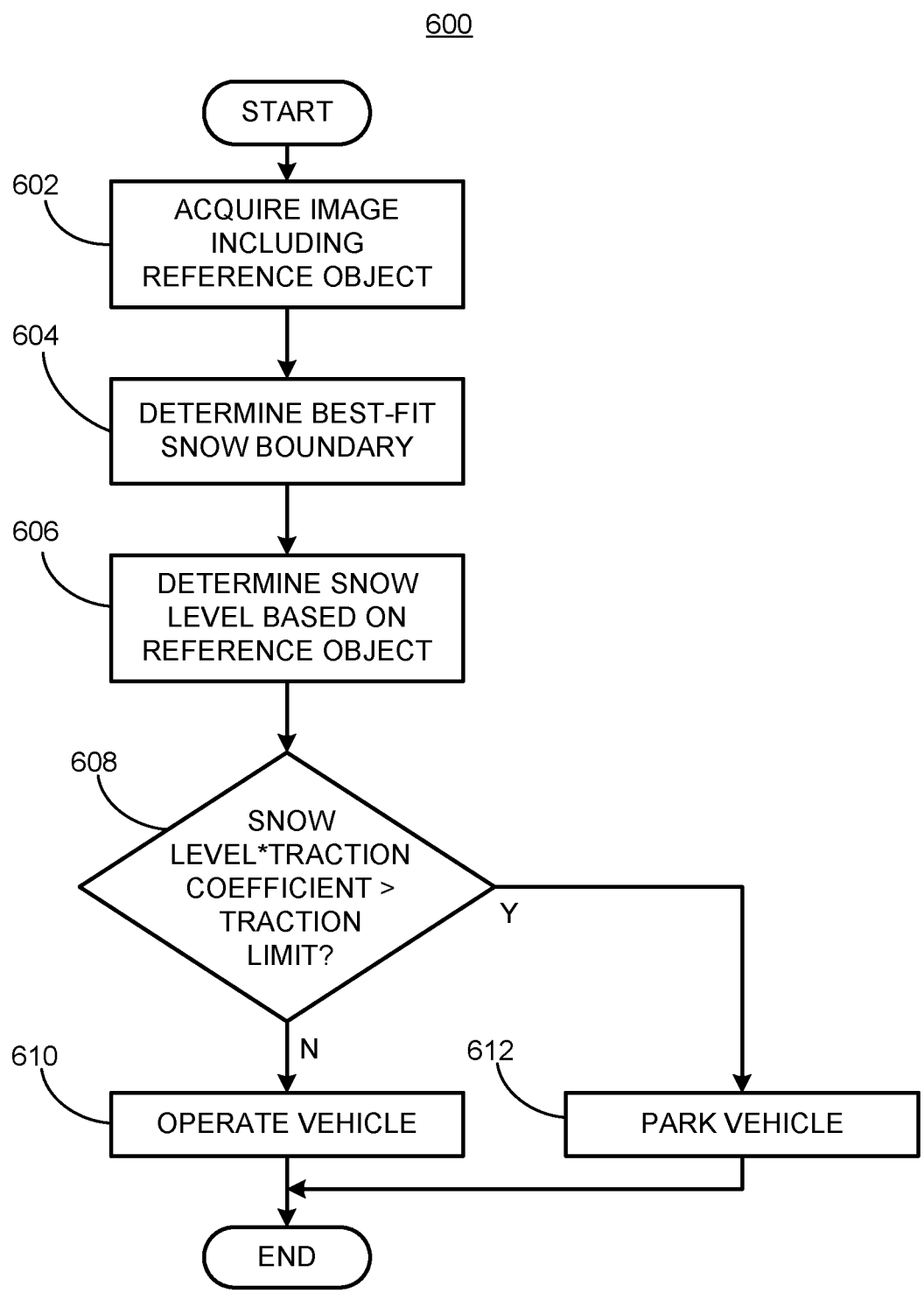
FIG. 6 is a flowchart diagram of an example process to determine a snow level and operate a vehicle.

FIG. 6 is a diagram of a flowchart, described in relation to FIGS. 1-5, of a process 600 for determining a snow level and operating a vehicle based on the snow level. Process 600 can be implemented by a processor of computing device 115 carrying out instructions stored in the computing device 115 memory, taking as input information from sensors 116, and executing commands and sending control signals via controllers 112, 113, 114, for example. Process 600 includes multiple steps taken in the disclosed order. Process 600 also includes implementations including fewer steps or can include the steps taken in different orders.

Process 600 begins at step 602, where a computing device 115 acquires a single video image 200, 300, 400, 500 that includes a reference object. The single video image 200, 300, 400, 500 can be acquired by a video sensor 116 included in a vehicle 110, where the reference object can be included in vehicle 110, or included in another vehicle. The single video image 200, 300, 400, 500 can also be acquired by another vehicle and transmitted to computing device 115 included in vehicle 110 via a V-to-V network or via a V-to-I network, where the reference object can be included in vehicle 110 or another vehicle. Techniques discussed herein are described as being accomplished with a single video image, however, these techniques can also be accomplished with two or more video images.

Next, at step 604, computing device 115 can determine a best-fit snow boundary 208 as described in relation to FIGS. 3 and 4. The best-fit snow boundary 208 can be determined by first determining a tire/snow boundary 206 based on the visual contrast between snow 204, 302, 404 (white) and a tire 202, 308, 402, 508 (black) in a single video image 200, 300, 400, 500. Computing device 115 can determine a best-fit snow boundary 208 that can be predetermined to be parallel to the roadway or surface under a single tire 202, 308, 402, 508 and fits the tire/snow boundary 206 so as to minimize the least-squares error between the tire/snow boundary 206 and the best-fit snow boundary 208.

Next, at step 606, a snow level 420 is determined based on a best-fit snow boundary 208 as described in relation to FIGS. 4 and 5. The reference object, which can be a single tire 202, 308, 402, 508 or another portion of a vehicle 110 or another vehicle such as a tailpipe 502, a light 506 or a bumper or fascia 504, can be used to determine a ground line 418, 516, and to determine the inches or millimeters/pixel. By using information regarding the radius of a tire 202, 308, 402, 508 and information regarding a predetermined distance 512, 520, 528 between a reference object and a ground line 418, 516, a best-fit snow boundary 208 and the determined ratio of inches or millimeters/pixel, computing device can determine a snow level 420 above a roadway or surface at a tire 202, 308, 402, 508 in inches or millimeters.

Next, at step 608, computing device can determine a traction coefficient as discussed in relation to FIG. 2, above. A traction coefficient can be combined with snow level 420 to determine a snow level/traction product that can predict whether a vehicle can successfully operate on roadways with determined snow level 420 covering of snow. The traction coefficient can combine tire size, tire condition and vehicle characteristics including powertrain configuration and weight to predict how a vehicle 110 will operate at a determined snow level 420. The traction coefficient can be multiplied by the snow level 420 to yield a snow level/traction product that can be compared to an experimentally, i.e., empirically, determined traction limit. If the snow level/traction product is less than to the experimentally determined traction limit, computing device 115 predicts that vehicle 110 can successfully operate on a roadway at snow level 420, and process 600 branches to step 612. If the snow level/traction product is greater than or equal to the experimentally determined traction limit, computing device predicts that vehicle cannot successfully operate on a roadway at snow level 420, and process 600 branches to step 610.

At step 610, computing device 115 has predicted that vehicle 110 can successfully operate on a roadway with determined snow level 420, and proceeds to operate vehicle 110. Computing device 115 can condition the operation of vehicle 110 based on the snow level 420 and the determined traction coefficient. For example, computing device 115 can limit the maximum speed and the maximum allowable longitudinal (powertrain and braking) and lateral (steering) accelerations based on the snow level 420, i.e. a non-zero snow level 420 that is less than the limit that would prevent operation. Non-zero snow level 420 that is less than the limit can produce slippery operating conditions that can require limiting longitudinal and lateral accelerations and maximum speed based on snow level 420 and traction coefficient to provide successful operation of vehicle 110, for example. Following step 610 process 600 ends.

At step 612, computing device 115 has predicted that vehicle 110 cannot successfully operate on a roadway with determined snow level 420, and if vehicle 110 is parked, commands vehicle 110 to remain parked. If vehicle 110 is being operated on a roadway, computing device 115 commands vehicle 110 to park. Following step 612 process 600 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   determining a best-fit snow boundary in an image including a reference object;
   determining a snow level based on comparing the best-fit snow boundary to the image of the reference object; and
   operating a vehicle by actuating vehicle components based on the determined snow level.

2. The method of claim 1, further comprising operating the vehicle by predicting that actuating vehicle components will result in successfully moving the vehicle to a determined location at a determined speed along a determined path at the determined snow level.

3. The method of claim 2, wherein predicting that actuating vehicle components will result in successfully moving the vehicle to the determined location at the determined speed along the determined path at the determined snow level includes determining a vehicle traction coefficient.

4. The method of claim 3, wherein determining the vehicle traction coefficient is based on a drive type, a tire type, and a tire condition.

5. The method of claim 1, wherein determining the best-fit snow boundary includes determining a line parallel to a roadway that minimizes a least squares error from the line to points associated with a tire/snow boundary in the image.

6. The method of claim 1, wherein the reference object is a vehicle tire.

7. The method of claim 6, wherein comparing the best-fit snow boundary to the vehicle tire includes determining a tire radius based on determining a tire type.

8. The method of claim 1, wherein the reference object is a portion of the vehicle including a tailpipe, a bumper, a light, or a fascia.

9. The method of claim 8, wherein comparing the best-fit snow boundary to the portion of the vehicle includes determining a height for the portion of the vehicle.

10. A system, comprising a processor; and
a memory, the memory including instructions to be executed by the processor to:
determine a best-fit snow boundary in an image including a reference object;
determine a snow level based on comparing the best-fit snow boundary to the image of the reference object; and
operate a vehicle by actuating vehicle components based on the determined snow level.

11. The processor of claim 10, wherein operating the vehicle by actuating vehicle components based on the determined snow level is based on predicting that actuating vehicle components will result in successfully moving the vehicle to a determined location at a determined speed along a determined path at the determined snow level.

12. The processor of claim 11, wherein predicting that actuating vehicle components will result in successfully moving the vehicle to the determined location at the determined speed along the determined path at the determined snow level includes determining a vehicle traction coefficient.

13. The processor of claim 12, wherein determining the vehicle traction coefficient is based on a drive type, a tire type, and a tire condition.

14. The processor of claim 10, wherein determining the best-fit snow boundary includes determining a line parallel to a roadway that minimizes a least squares error from the line to points associated with a tire/snow boundary in the image.

15. The processor of claim 10, wherein the reference object is a vehicle tire.

16. The processor of claim 15, wherein comparing the best-fit snow boundary to the vehicle tire includes determining a tire radius based on determining a tire type.

17. The processor of claim 10, wherein the reference object is a portion of the vehicle including a tailpipe, a bumper, a light, or a fascia.

18. The processor of claim 17, wherein comparing the best-fit snow boundary to the portion of the vehicle includes determining a height for the portion of the vehicle.

19. A system, comprising
a sensor operative to acquire an image;
vehicle components operative to operate a vehicle;
a processor; and
a memory, the memory including instructions to be executed by the processor to:
determine a best-fit snow boundary in the image including a reference object;
determine a snow level based on comparing the best-fit snow boundary to the image of the reference object; and
operate the vehicle by actuating vehicle components based on the determined snow level.

20. The system of claim 19, wherein operating the vehicle by actuating vehicle components based on the determined snow level is based on predicting that actuating vehicle components will result in successfully moving the vehicle to a determined location at a determined speed along a determined path at the determined snow level.

* * * * *